United States Patent [19]

North

[11] 3,827,404
[45] Aug. 6, 1974

[54] FEEDER DEVICE
[76] Inventor: Max D. North, Midway, Utah
[22] Filed: July 31, 1972
[21] Appl. No.: 276,850

[52] U.S. Cl............... 119/51.11, 222/243, 222/287
[51] Int. Cl.......................................... A01k 5/02
[58] Field of Search......... 119/5, 51 R, 51.11, 56 R; 222/200, 243, 287, 291, 309, 342, 409, 440

[56] References Cited
UNITED STATES PATENTS

| 2,782,962 | 2/1957 | Mercer | 222/243 X |
| 2,800,256 | 7/1957 | DiNuzzo | 119/5 X |
| 3,029,790 | 4/1962 | Loudon | 119/51.11 |
| 3,534,708 | 10/1970 | Cauffman | 119/51.11 |

Primary Examiner—Louis G. Mancene
Assistant Examiner—J. A. Oliff

[57] ABSTRACT

An automated feeding apparatus with a solinoid-powered sweeper that scatters controlled amounts of feed from off a platform onto which loose dry feed pours from a hopper above. The sweeper is provided with adjusting threads and may be a simple stove bolt for easy adjustment of the penetration of the sweep. A timer is also provided to increase or decrease the solinoid activation frequency for further controlling the amount of feed dispensed during a given period as well as dispensing at the desired time of day.

10 Claims, 5 Drawing Figures

PATENTED AUG 6 1974  3,827,404
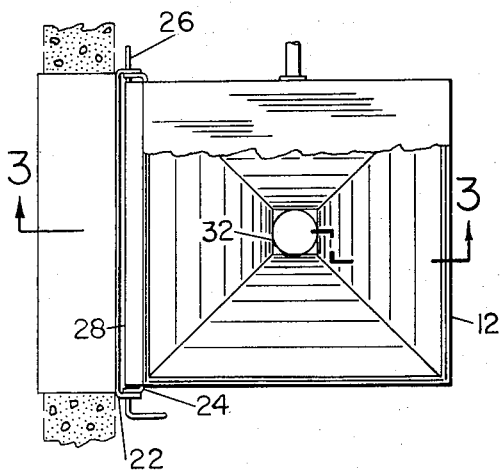
Fig. 2
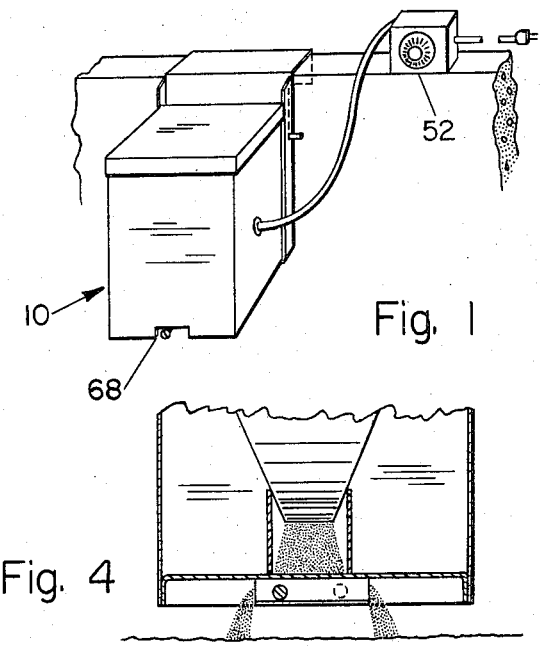
Fig. 1
Fig. 4
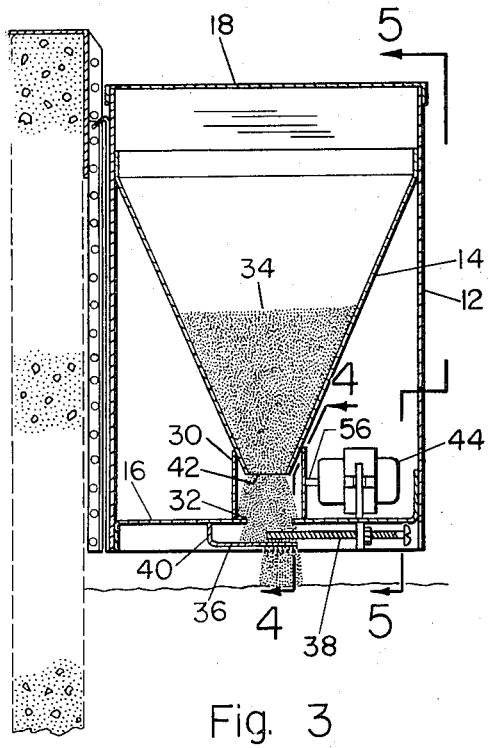
Fig. 3
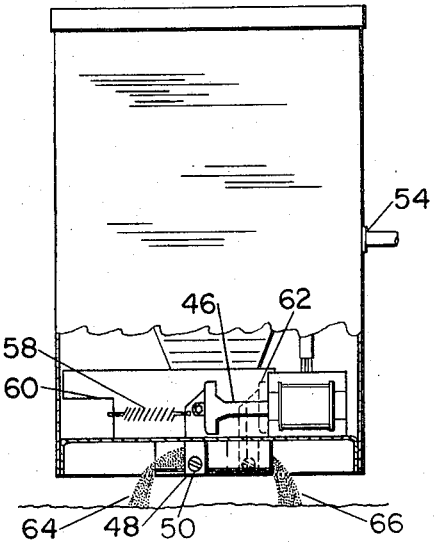
Fig. 5
INVENTOR:
MAX D. NORTH

FEEDER DEVICE

The present invention relates to an apparatus for dispensing dry granular feed and the like, and more particularly to an apparatus for automatically feeding fish the desired amounts and at intervals as desired.

At a fish hatchery where fish are raised for planting in lakes and streams it is very important to attend to the feeding of the small young fish regularly and to feed them the proper amounts conducive to their fast growth without wasting the feed. It is extremely difficult for this to be accomplished by manual labor regularly without costly interruption of other work and to scatter the feed on the water in a consistant manner according to the needs of the delicate young fish.

Although the present invention was originally intended for feeding of small young fish, it is just as useful in dispensing loose dry feed to any type of creature of the air, earth, or water.

Any object of my invention is to provide an outomatic feeding device that dispenses loose dry feed in a consistant manner so that the amount per feeding and per 24-hour period can be depended upon according to adjustments and timing as desired.

Another object of my invention is to provide an automatic feeding device that is trouble free in being simple in function and having very few moving parts.

Another object of my invention is to provide an automatic feeding device that is easy to adjust for varying the amount of feed dispensed at each feeding, as well as the frequency and the hour of each feeding.

Another object is to provice an automatic feeder device with means for varying its height at which it may be set above water or ground to scatter the feed in a more or less concentrated area as desired.

Another object of my invention is to provide an automatic feeder device that can be readily removed from its position in use, cleaned and otherwise serviced, and replaced without the necessity of re-setting any adjustments.

Yet another object is to provide an automatic feeding device in which the adjusting means allow a wide variation in amount of feed dispensed at each feeding.

A further object of my invention is to provide an automatic feeding device using standard parts and materials for inexpensive manufacture.

Another object is to provide an automatic feeding device in which the moving parts are grouped as a separate assembly for easy and inexpensive replacement of the worn parts only.

With these objects in view, as well as other objects which become apparent in the course of the specification, reference is had to the accompanying drawing, wherein:

FIG. 1 is a perspective view of the fish feeder device with electric cord and timer.

FIG. 2 is a top view with the cover partially broken away.

FIG. 3 is a sectional view taken along the lines 3—3 of FIG. 2.

FIG. 4 is a sectional view taken along the lines 4—4 of FIG. 3.

FIG. 5 is a partial section view taken along the lines 5—5 of FIG. 3.

Referring to the drawing for further disclosure and clarification of the function of my invention, the numeral 10 designates the fish feeder illustrated in FIG. 1. Housing 12 encompasses a hopper 14, floor 16, and other component parts of my invention over which is a cover 18. For the most part my feeder device is preferably constructed of corrosion resistant sheet metal.

Support means comprising bracket 20 and adjustment plates 22 and 24 with holes in line for pin 26, hold my fish feeder inside the fish tank and allow for height adjustment so that it can be placed the desired height above the water. Support plate 28, being rigidly attached to the housing 12, holds the fish feeder assembly in place when hooked over adjustment plate 24.

A spacer member 30, of generally square tubular shape in upright position surrounds and supports the funnel shaped hopper in a higher position so that the sloping side to the right does not interfer with the solinoid motor nor the reciprocating movement of the armature.

The loose feed 34 flows readily through the hole 32 in the floor 16 and onto the platform 36 where it remains until swept off by sweeper member 38. The platform 36 is properly spaced below the floor by vertical portion 40 of the platform so that when the loose feed is left undisturbed it piles up and blocks the hole 32. This blocking action allows the feed to pile up above the floor 16 and block the outlet 42 of the hopper, stopping the feed from further flow. This is best illustrated in FIG. 3.

To give linear reciprocating movement to sweeping member 38, a solinoid motor 44 is mounted on the floor 16 so that the extending and retracting armature 46 moves in a line perpendicular to the vertical plane of the sweeper major axis. To transmit the said movement to the sweeper, a bracket 48 that protrudes through a slot in the floor is rigidly attached to the head of armature 46 and the sweeper is mounted to the bracket near the lower end through a threaded hole at 50. Refer to FIGS. 3 and 5. Electrical power is supplied to the solinoid motor leading from timer 52 through the housing at 54 to the solinoid motor at 56.

A tension spring 58 is attached to and suspended between sweeper bracket 48 and holding bracket 60 to pull armature 46 into extended position as shown in FIG. 5 and to so hold until activated. For economical fabrication, the holding bracket could be a continuation of the front wall of the space member bent to a general U configuration.

When the extending and retracting armature is activated by the energized solinoid motor, the armature retracts into the position shown at 62. As clearly illustrated, the linear reciprocating movement of the sweeper thus pushes the feed off the platform at each stroke and onto the water as shown at 64 and 66. Refer to FIGS. 4 and 5.

In FIG. 3 is shown the sweeper 38 in the form of an ordinary stove bolt which can easily be screwed either direction to change the distance from bracket 48 to the end of the sweeper, causing the sweeper to reach farther into, or to a less degree into, the pile of feed on the platform as desired, thereby increasing or decreasing the amount of feed swept off the platform at each stroke. A lock nut is provided against the bracket to hold the adjusted position of the sweeper. The use of a stove bolt as the sweeper provides for use of standard parts in keeping production costs low.

It will be noted also that a clearance between the sweeper and the platform is provided to avoid any chance of interference of parts and to allow frictionless passage of the sweeper through the loose feed.

Access to the head of the stove bolt used as the sweeper member is had through the cut-out 68 of the lower front wall of the frame. Refer to FIG. 1.

From the foregoing description, it is apparent that my invention provides a new and novel feeder device which is very reliable and trouble-free in operation, is easy to adjust for changing the amount of feed dispensed at each motion of the activating motor, is capable of response to a wide range of settings of the timer for various feeding requirements, is easy to remove from and replace on tank, is easy to store, and which is easy to manufacture and low in cost.

Various changes in the size, form, configuration, and construction of my invention shown and described herein may be made without departing from the spirit of the invention, the scope of which is set forth in the appended claims.

What I claim as new and desire to protect by letters patent is:

1. A feeding device for containing and automatically scattering loose feed, comprising
   a. A hopper with sloping sides forming an outlet at the bottom thereof,
   b. Floor means through which is an orifice below the bottom of said hopper,
   c. Housing means giving support to said hopper and said floor means,
   d. Spacer means surrounding said hopper outlet to provide room for function of a sweeper-activating means,
   e. Platform means in spaced position below said floor means for receiving said feed coming through said orifice of said floor means,
   f. Sweeper means for moving the feed off said platform and scattering it onto a surface therebelow,
   g. Adjustment means for varying the length of said sweeper means so that more or less feed is moved off said platform at each stroke,
   h. Said sweeper-activating means giving said sweeper means reciprocating motions in directions horizontally transverse to said length of said sweeper means,
   i. A timer for automatically energizing said sweeper-activating means according to frequency of strokes and time of day as desired,
   j. Support means for attaching said feeding device on the side of a fish tank,
   k. And height-adjustment means for varying the height of said feeding device.

2. The feeding device of claim 1 wherein said spacer means is substantially of tubular configuration placed in upright position.

3. The feeding device of claim 1 wherein said hopper is substantially funnel-shaped.

4. The feeding device of claim 3 wherein said spacer means is rigidly attached to said floor means and supports said funnel-shaped hopper.

5. The feeding device of claim 1 wherein said platform means is formed in an L shape and the vertical portion is attached to the bottom of said floor means.

6. The feeding device of claim 1 wherein said sweeper means is a bolt.

7. The feeding device of claim 6 wherein said bolt is located in a threaded hole of a bracket which in turn is attached to an armature head of a solinoid motor.

8. The feeding device of claim 1 wherein said sweeper-activating means is a solinoid motor.

9. The feeding device of claim 1 wherein said feeder support means include a bracket with the upper portion bent into a general inverted U shape, said bracket being attached to an adjustment plate flanged on each vertical side and made to slidably fit outside of the flanges of another flanged adjustment plate, and a support plate attached to the back of the feeder housing means with the upper edge acutely bent outwardly and downwardly for hooking over the upper edge of said adjustment plate.

10. The feeder device of claim 1 in which said height adjustment means include a series of holes in each flange of two adjustment plates and a long pin for inserting through a pair of opposing holes in said flanges according to height desired.

* * * * *